2 Sheets--Sheet 1.

H. SMITH.

Horse-Powers.

No. 5,226. Reissued Jan. 7, 1873.

WITNESSES.

Villette Anderson

Phil. Masi.

INVENTOR.

H. Smith,

Chipman & Frazer & Co.

Attorneys.

AM. PHOTO-LITHOGRAPHIC CO. N.Y. (OSBORNE'S PROCESS.)

2 Sheets--Sheet 2.

H. SMITH.

Horse-Powers.

No. 5,226. Reissued Jan. 7, 1873.

WITNESSES.

Villette Anderson.
Phil C Masi

INVENTOR.

H. Smith
Chipman & Coomerle
Attys

AM. PHOTO-LITHOGRAPHIC CO. N.Y. (OSBORNE'S PROCESS.)

UNITED STATES PATENT OFFICE.

HEMPHILL SMITH, OF SHELBY STATION, TENNESSEE.

IMPROVEMENT IN HORSE-POWERS.

Specification forming part of Letters Patent No. 120,678, dated November 7, 1871; reissue No. 5,226, dated January 7, 1873.

*To all whom it may concern:*

Be it known that I, HEMPHILL SMITH, of Shelby Station, in the county of Shelby and State of Tennessee, have invented a new and Improved Horse-Power; and I do hereby declare that the following is a full, clear, and exact description of the same, reference being had to the accompanying drawing, in which—

Figure 1:
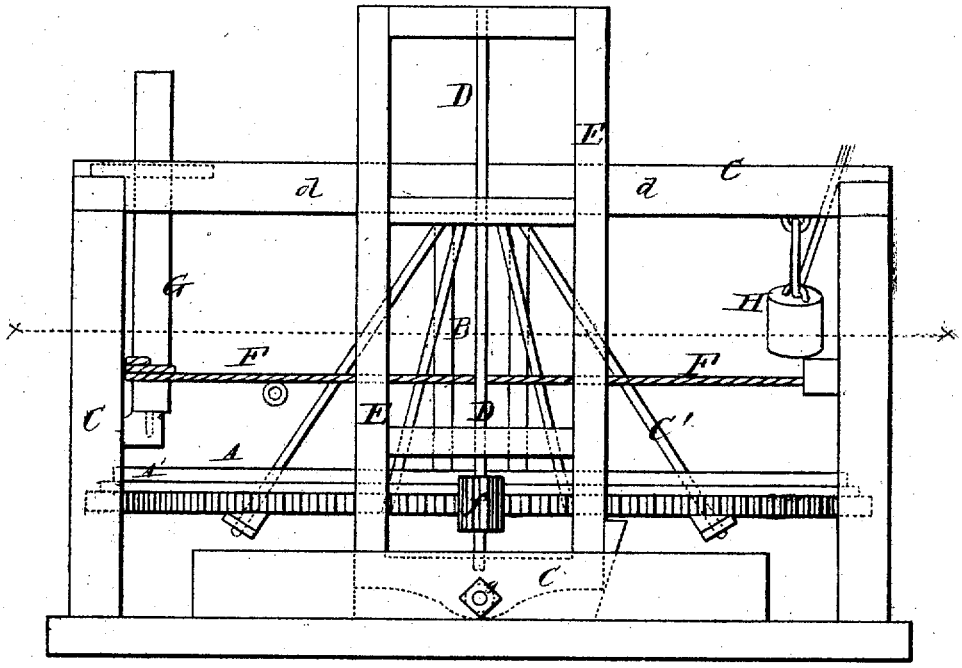
Figure 2:
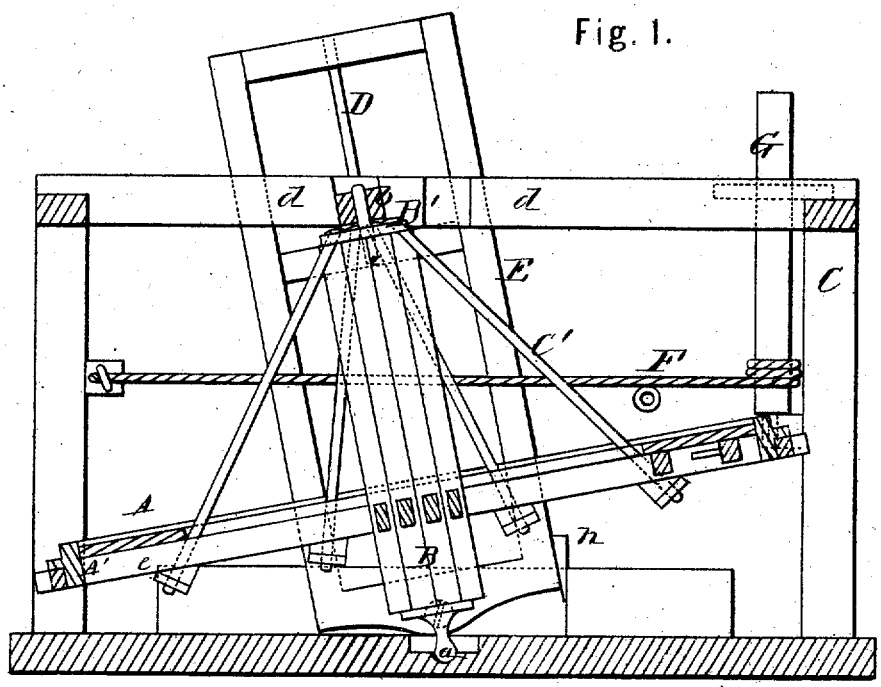
Figure 3:
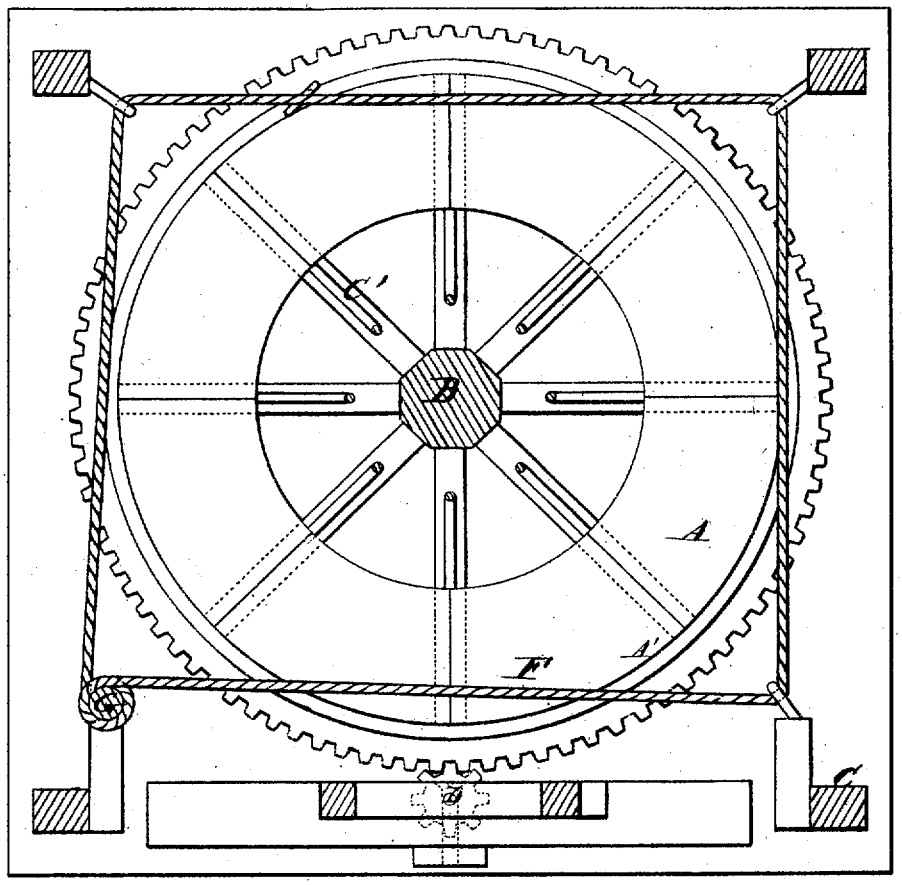

Figure 1 represents a side elevation of my invention, showing the wheel in a horizontal position. Fig. 2 is a vertical transverse sectional representation, showing the wheel in an inclined position. Fig. 3 is a representation of my invention in horizontal section taken on the plane of line *x x*, Fig. 1.

This invention has relation to certain improvements in horse-powers; and it consists in the novel arrangement of the draft-rope, windlass, and rope, in connection with the frame of the horse-power, and in the construction and novel arrangement of the wheel-rimming, all substantially as hereinafter more fully described.

A in the drawing represents the power-wheel of my improved horse-power. B is the shaft upon which it is mounted. The lower end of this shaft has a journal, which rests in a step, *a*, which is secured in the bed of the supporting-frame C. The upper end of the shaft has a gudgeon-plate, B′, the journal of which turns in a movable cross-piece, *b*, which is held between longitudinal bars *d d* of the frame C. This gudgeon-plate has a shank, Z, which is driven into the end of the shaft, bringing the gudgeon-plate close down to the latter, allowing it to be fastened by four spikes driven into the shaft through holes in the plate. Other holes in the plate near its edge, receive the ends of the oblique wheel-brace rods C′, which are secured to the gudgeon-plate by means of nuts turned on their ends, as shown. The gudgeon-plate and braces thus tend to mutually support each other. When the wheel is in a horizontal position it can be used as a tread-wheel, its surface being properly floored for that purpose. When the flooring is removed the wheel can be used as a draft-wheel by hitching the animal to its radial arms *e e*. The periphery of the wheel A is toothed and meshes into the teeth of a pinion, *f*, that is mounted upon a vertical shaft, D. In whatever manner the wheel A may be revolved it will impart rotary motion to the shaft D, and thence to the machinery with which it is connected. The wheel has a rim, A′, made of planks bent to the circle of the wheel. The teeth or toothed segments are bolted to this rim. The shaft D has its bearings in a frame, E, which is, at *g*, pivoted to the frame C. When the wheel A is to be inclined the cross-piece *b* is shifted in the beams *d* into the position shown in Fig. 2. The frame E is then also swung to the side and locked by wedges *h*, so that the shafts B and D will be parallel. The beams *d* are notched or grooved for the reception of the cross-piece *p* in the several positions. The wheel can thus be used either inclined or horizontally, and in the latter position either as a tread-wheel or draft-wheel. When used as a tread-wheel the rope F is stretched along the frame C and connected with a windlass, G, which may have a ratchet and pawl to be prevented from unwinding. The horses are hitched to this rope, the windlass serving to equalize their power.

In connection with the rope, I may use weights H, suspended at the corners of the frame C. The horses are hitched to these weights and their breast-straps connected with the rope. Their power will be increased the more they draw on the weights while treading on the wheel. This arrangement of rope and weights serves properly to control the animals during action and dispense with the driver.

Having fully described my invention, what I claim as new, and desire to secure by Letters Patent, is—

1. The draft-rope F and windlass G applied to the frame C of a horse-power, substantially as and for the purpose specified.

2. The draft-weight H applied to the horse-power, in combination with the rope F, as specified.

3. The horse-power wheel A having the bent wood rim A′, with the teeth bolted thereto, substantially as described.

In testimony that I claim the above I have hereunto subscribed my name in the presence of two witnesses.

H. SMITH.

Witnesses:
M. C. NUSE,
A. R. BARRET.